June 7, 1949.   R. R. BLOSS ET AL   2,472,061
ROTARY SWIVEL FOR DRILLING RIGS
Filed March 18, 1946   7 Sheets-Sheet 4

INVENTORS
Richard R. Bloss
Archie R. McLerran
BY
E. V. Hardway
ATTORNEY

Patented June 7, 1949

2,472,061

UNITED STATES PATENT OFFICE 2,472,061

ROTARY SWIVEL FOR DRILLING RIGS

Richard R. Bloss and Archie R. McLerran, Beaumont, Tex., assignors to International Derrick & Equipment Company, Columbus, Ohio, a corporation of Ohio Application March 18, 1946, Serial No. 655,182

3 Claims. (Cl. 285—90)

This invention relates to a rotary swivel for drilling rigs.

In drilling wells with a rotary drilling machine the drilling fluid is delivered into the drill stem through a swivel which is suspended in the derrick. The drilling fluid is delivered to the stationary gooseneck of the swivel through a hose leading from the slush pump while a rotatable part of the swivel turns with the drill stem. The normal pressure of the drilling fluid ranges normally between 400 pounds per square inch to 2,500 pounds per square inch and the drill stem rotates with the rotary table at a normal speed of from 60 to 300 or more revolutions per minute. The swivel includes a wash pipe for conducting the drilling fluid down through the swivel and sealing means is provided between the wash pipe and the rotatable stem of the swivel.

In conventional types of swivel the wash pipe is usually rigidly connected to the gooseneck, preferably, by a flanged connection.

It is very difficult to manufacture the component parts of the swivel so that the axis of the wash pipe and the axis of the swivel stem and drill stem are in exact alignment. If the wash pipe is off center with respect to the swivel stem or if it is at an angle to the stem, as a result of imperfect connecting threads, or because of improper application of the wash pipe in the field, which frequently occurs due to wear, then the packing elements or seal, around the wash pipe are subjected to unequal pressures and are therefore rapidly worn away thus necessitating frequent installation of new packing.

It has been found in practice that a very slight eccentricity of the wash pipe or a very small angular misalignment thereof will greatly accelerate the wear on the packing and on the wash pipe.

It is a prime object of the present invention to provide a rotary swivel of the type referred to wherein the wash pipe is so mounted that it may move, or gyrate, to automatically align and center itself with respect to the packing and thereby eliminate any undue wear on the packing and wash pipe due to axial misalignment either of the packing or the wash pipe supporting members.

It is a further object of the invention to provide in a rotary swivel a wash pipe that is so mounted therein as to allow lateral movement of the wash pipe, in any direction, relative to the supporting structure of the swivel.

It is a further object of the invention to provide, in a rotary swivel, a wash pipe which is resiliently mounted so that it will have a reciprocating, axial, movement with respect to the packing, such reciprocating movement being imparted to the wash pipe by the pump pulsations which are transmitted by the drilling fluid.

The advantage of this reciprocating movement of the wash pipe results in the fact that the wear is distributed over a great portion of the wash pipe by this motion and the lubrication of the wash pipe and packing is improved and the lubricant which is introduced into the packing container is thereby carried to the lips of the packing members.

A still further object of the invention resides in the provision of a rotary swivel wherein the wash pipe assembly is so mounted that the parts will not be liable to become frozen or stuck in the supporting members by reason of corrosion or foreign matter and said wash pipe assembly can thereby be easily removed.

With the above and other objects in view the invention has particular relation to certain novel features of construction, operation and arrangement of parts, examples of which are given in this specification and illustrated in the accompanying drawings, wherein.

Figure 1:
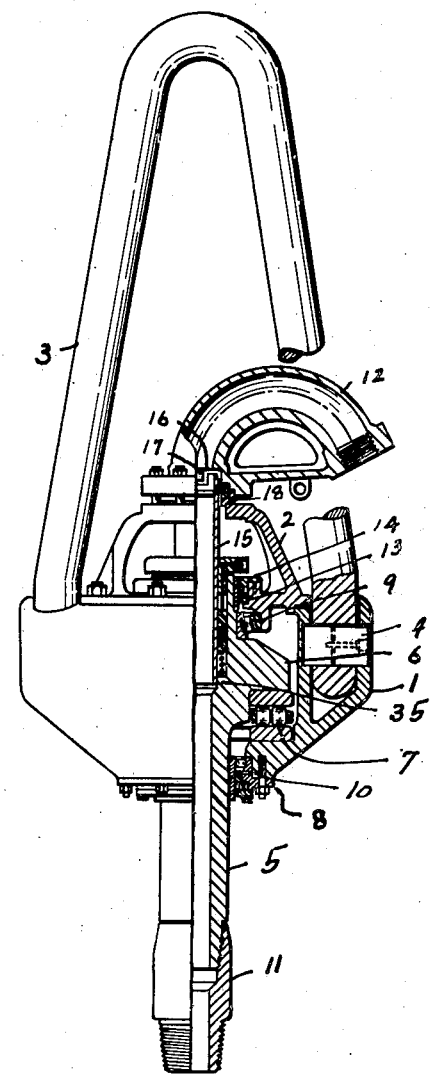
Figure 1 is a side elevation partly in section of a rotary swivel showing a preferred embodiment of the invention.

Referring now more particularly to the drawings wherein like numerals of reference designate similar parts in each of the figures, the numeral 1 designates the swivel body mounted on which there is the body cover 2, bolted or otherwise secured to the body. The swivel is supported from the traveling block of a well drilling rig by the bail 3 whose ends may be secured to the body in any approved manner as by the bail pins 4. The numeral 5 designates a tubular swivel stem whose upper end is enlarged forming the head 6 within the body and which is supported on the main swivel bearing 7, of conventional construction and which is supported by the lower end of the body.

The swivel stem is surrounded by a suitable packing gland, as 8, which is carried by the lower end of the body 1 for the purpose of retaining oil in the body.

The swivel stem is also maintained in alignment with respect to the body by the upper and lower alignment bearings 9 and 10.

The swivel stem may be connected to the upper end of the grief joint of a drill stem by the lower coupling 11.

Mounted on and secured to the body cover there is a tubular connection 12 commonly known as a gooseneck and whose outer end is threaded plus providing for the connection of a hose thereto. This hose is connected, at its other end, to a slush pump by means of which drilling fluid is forced downwardly through the swivel and drill stem.

The upper end of the swivel stem 5 is reduced in diameter and is fitted through the body cover, as illustrated in Figure 1, and a packing 13 surrounds said extended end, within the cover, and is retained by a retainer ring 14 thus providing a tight joint between the cover and the upper end of the swivel stem to retain oil in, and exclude foreign matter from, the body.

Figure 3:
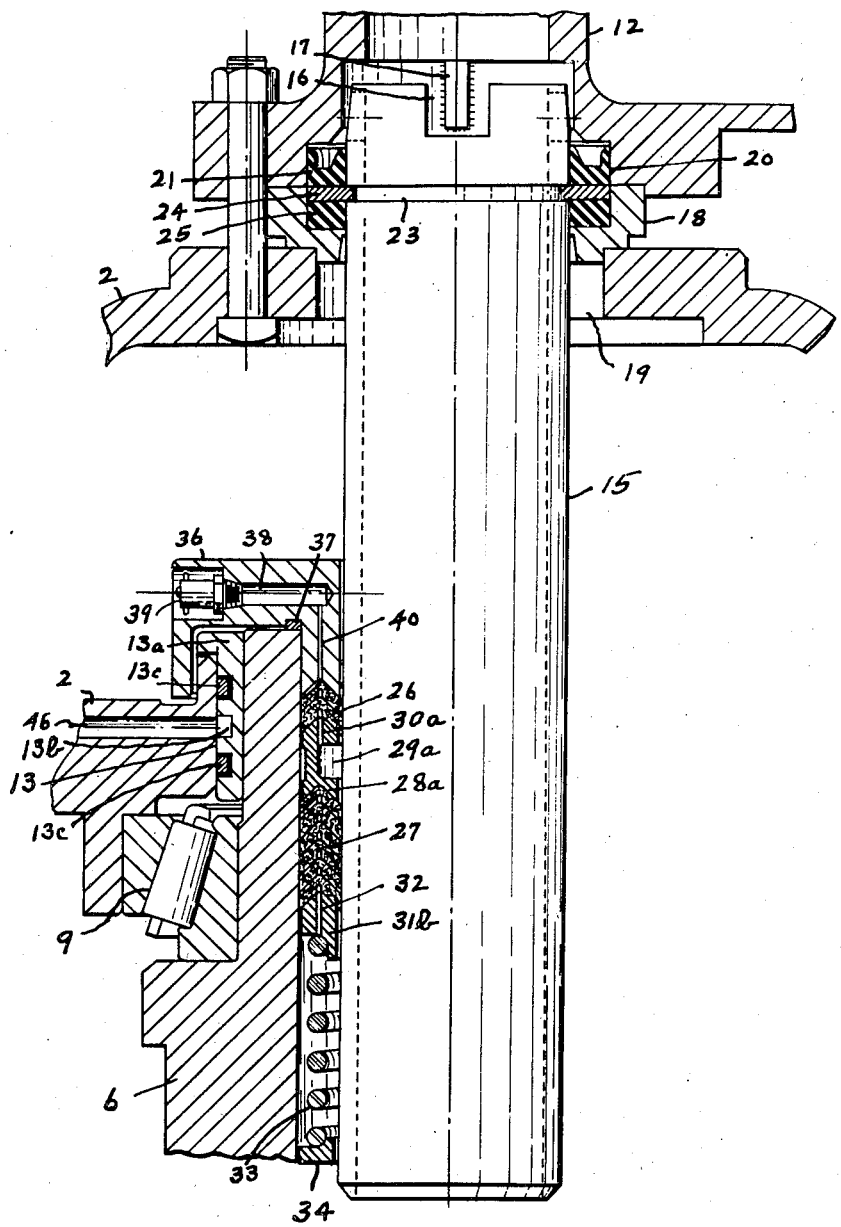
Figure 3 is a fragmentary, vertical, sectional view wherein an adapter is employed for supporting the wash pipe, as illustrated in Figure 1.

In the embodiment of the invention illustrated in Figure 1 there is a tubular wash pipe 15. The upper end of this wash pipe extends up into the anchored end of the gooseneck, said end of the gooseneck being internally enlarged to receive the end of the wash pipe and the upper end of the wash pipe has one or more notches, as 16, to loosely receive a corresponding lug, or lugs, 17 fastened to the gooseneck and which prevents the wash pipe 15 from turning with the swivel stem. This embodiment of the invention is also illustrated in Figure 3 wherein an annular adapter 18 is employed which is seated in the top opening 19 in the body cover. This adapter is provided for the purpose of installing the present wash pipe installation on swivels that have already been manufactured.

Countersunk into the base of the gooseneck there is a countersunk bore 20 to receive the packing ring 21 which is provided with the upwardly directed outer and inner lips to fit against the wall of the counterbore and around the wash pipe 15 respectively. In this embodiment of the invention the upper end of the wash pipe is provided with an external annular groove 23 and a sectional retaining ring 24 is fitted into said groove.

The upper end of the adapter 18 is also counterbored to receive a resilient supporting ring, or mount, 25 on which the retaining ring 24 is supported when the swivel is assembled.

Figure 2:
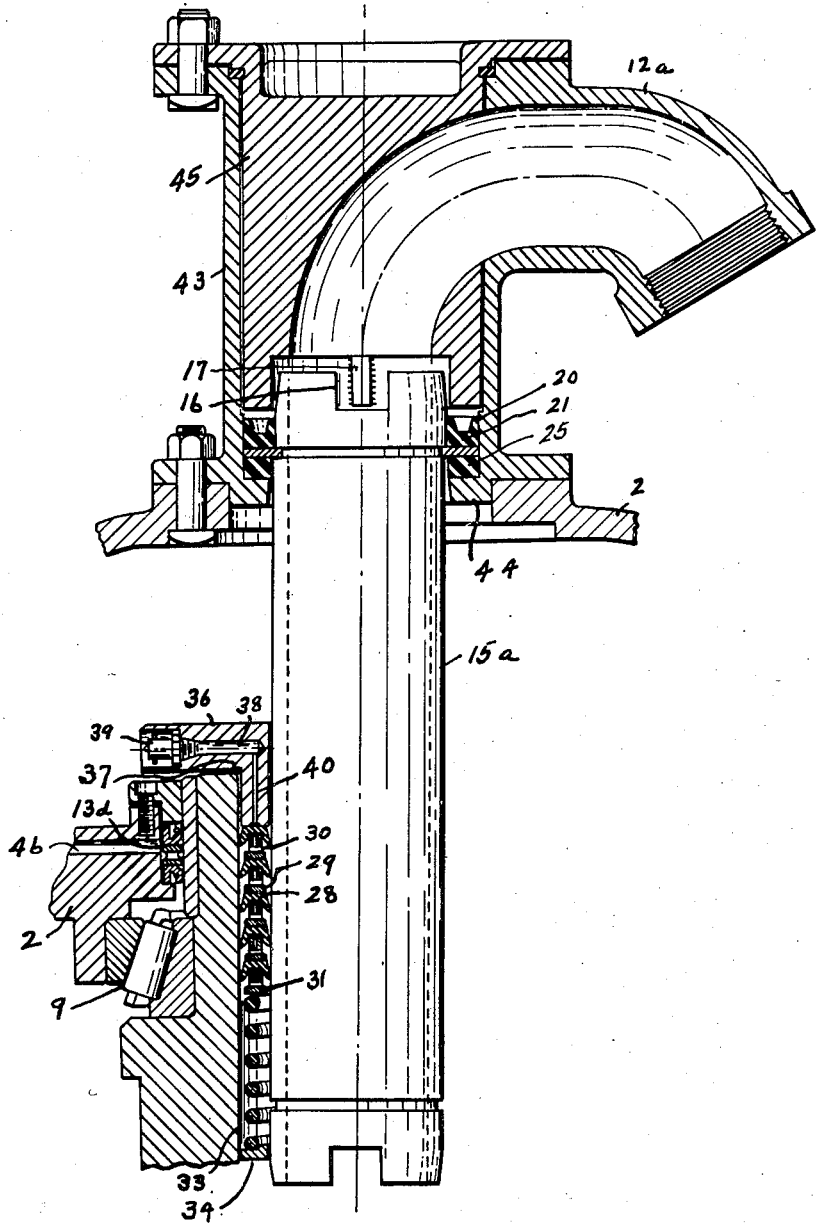
Figure 2 is a fragmentary, vertical, sectional view of another embodiment of this invention.

The upper end of the swivel stem 5 is counterbored internally and the lower end of the wash pipe extends down into said counterbore and surrounding said wash pipe in said counterbore there are suitable packing assemblies of either of the forms shown in Figures 2 and 3.

As illustrated in Figure 2 this assembly comprises inverted U-shaped packing rings, as 28, of annular formation which are separated by the annular spacer rings 29 and the assembly is provided with suitable lubricant ducts, as 30. The assembly is supported on a lower supporting ring 31 which in turn is supported on a strong coil spring 33 which surrounds the wash pipe and which in turn, is seated on a lower annular spring seat 34, which rests on the inside shoulder 35 at the bottom of the counterbore in the swivel stem. As illustrated in Figure 3 the packing assembly comprises the upper and lower series of packing rings 26 and 27 formed of suitable packing material and having downwardly directed outer and inner lips separated by a suitable spacing ring 28a having an inside annular groove 29a with a duct, or ducts, 30a leading downwardly into said groove 29a. The series of packing rings are supported on a lower ring 31b of slightly larger inside diameter than the external diameter of the wash pipe and this ring has one or more ducts 32 leading downwardly therethrough. This packing assembly illustrated in Figure 3 is supported on the coil spring 33, as illustrated and described in Figure 2. The lower end of the ring 31a is formed into an upper annular spring seat to receive the upper end of the spring 33.

An annular gland 36 surrounds the wash pipe and is fitted between it and the upper end of the swivel stem, against the packing assembly. This gland is secured in position in any approved manner, as by bolting it to the body 6, and between the gland and the upper end of the swivel stem there is an annular gasket 37. The gland 36 has a radial bore 38 whose outer end is enlarged to receive a fitting 39 for a grease gun and leading downwardly from the inner end of said bore there is a duct 40 for conducting a lubricant to the packing assembly shown in Figure 2 which will find its way through the ducts 30 to the packing to be lubricated. In the form shown in Figure 3 the lubricant will be forced into the groove 29a and from there to the packing to lubricate the same. The pump pulsations will cause an axial reciprocation of the wash pipe to conduce to a better distribution of the lubricant, as hereinabove referred to.

The packing 13, hereinabove referred to, between the cover 2 and the upper end of the swivel stem may include a sleeve 13a around the upper end of the swivel stem and rotatable with the stem and having an external annular groove 13b for lubricant with the piston rings 13c, above and beneath said groove and countersunk into the sleeve 13a.

Figure 11:
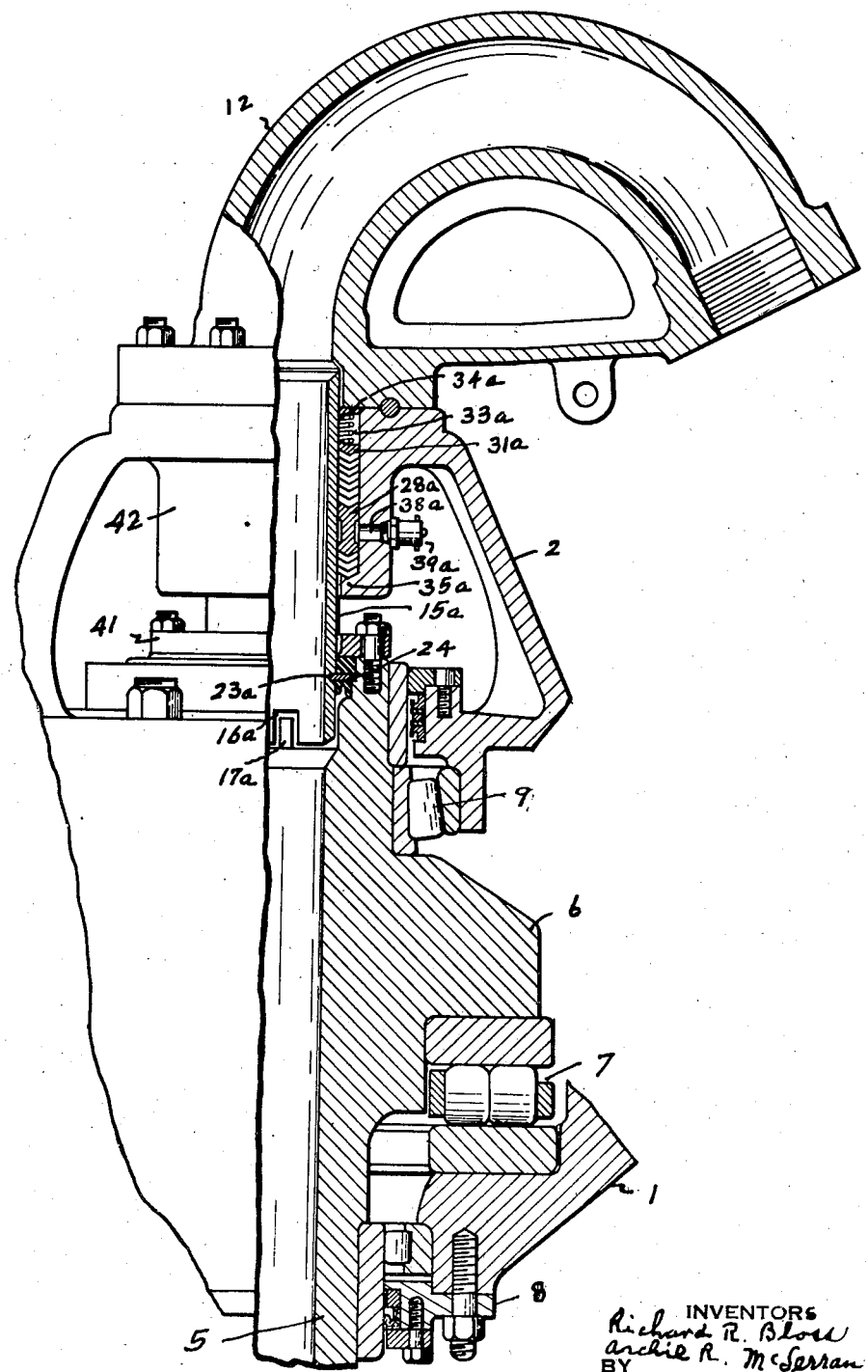
Figure 11 is a fragmentary, vertical, sectional view with the packing assemblies reversed with respect to the similar arrangement illustrated in Figure 1.

The construction illustrated in Figure 11 is substantially the same as that illustrated in Figures 1 and 3 with the exception that the adapter 18 has been dispensed with and the packing assembly which is shown in Figure 1 as being mounted in said adapter and base of the gooseneck is reversed in position and mounted in the upper end of the swivel stem around the lower end of the wash pipe 15a and retained in place by the annular clamp plate 41 which closely surrounds said wash pipe and is bolted to the upper end of the swivel stem; also in this embodiment the groove 23a is formed at the lower end of the wash pipe to receive the retainer ring 24. Furthermore in this embodiment of the invention the packing assembly which is shown mounted in the swivel stem around the wash pipe is mounted within a depending packing retainer 42 which depends from the body cover and which has an external annular shoulder 35a to support said packing assembly which is maintained under compression by an upper spring 33a between the upper and lower annular spring seats 34a and 31a. The lower end of the gooseneck 12 of this embodiment is internally counterbored to receive the plain upper end of the wash pipe 15.

It will be observed that the packing assembly about the wash pipe 15a in Figure 11 is substantially the same as the packing assembly about the lower end of the wash pipe 15, as shown in Figure 3, inverted. In this embodiment of the invention the lower end of the wash pipe is provided with a notch 16a provided to receive an inside lug 17a in the upper end of the swivel stem to cause the wash pipe to turn with the stem.

As illustrated in Figure 11 the packing assembly is lubricated through the bore 38a into the outer end of which the grease gun connection 39a is screwed.

In other respects the form shown in Figure 11 is substantially the same as that shown in Figures 1 and 3.

Referring to Figure 2 it is to be observed that the gooseneck 12a is formed with a cylindrical jacket 43 which is bolted directly to the body cover 2 and whose lower end is formed with an inside inwardly extended flange 44 to support the ring 25. In this form the jacket 43 contains a filler block 45 whose upper end is secured to the upper end of the jacket in sealed relation therewith and whose lower end is provided with the lug 17 which fits loosely in the notch 16 in the upper end of the wash pipe. In this form of the swivel illustrated in Figure 2 it is to be noted that the wash pipe is of a form to allow it to be reversed. As illustrated the upper and lower ends of the wash pipe are identical to permit its reversal; however the reversible type is not to be limited to the specific form shown. In both of these forms lubricant channels 46 are provided through the body cover 2 for the admission of a lubricant to the seal rings 13, 13d.

In other respects than those above pointed out the form of the swivel as illustrated in Figure 2 is substantially the same as that shown in Figure 3.

Figure 4:
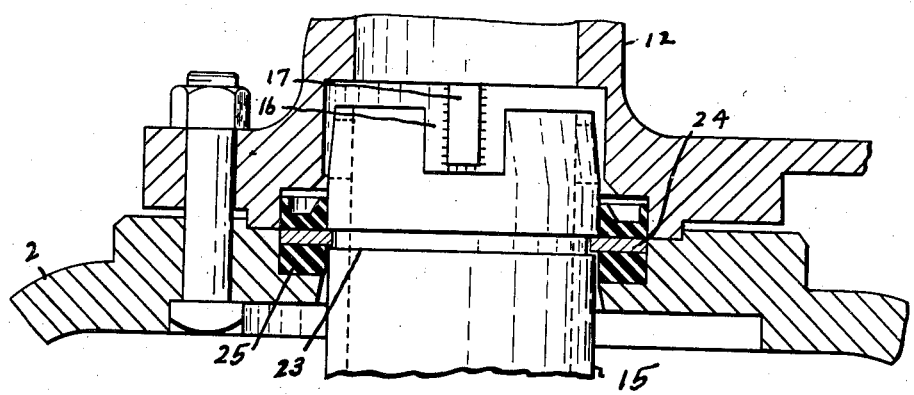
Figure 4 is a fragmentary, sectional view illustrating the wash pipe packing and supporting assembly, as illustrated in Figure 3, wherein the adapter has been eliminated.

Referring to Figure 4 the construction shown in this figure is substantially the same as that shown in Figure 3, excepting that the adapter 18 is omitted and the gooseneck is fitted to and bolted to the body cover 2 directly. The packing about the upper end of the wash pipe 15 and the means for supporting said washpipe, are the same in this figure as the corresponding parts shown in Figure 3.

Figure 5:
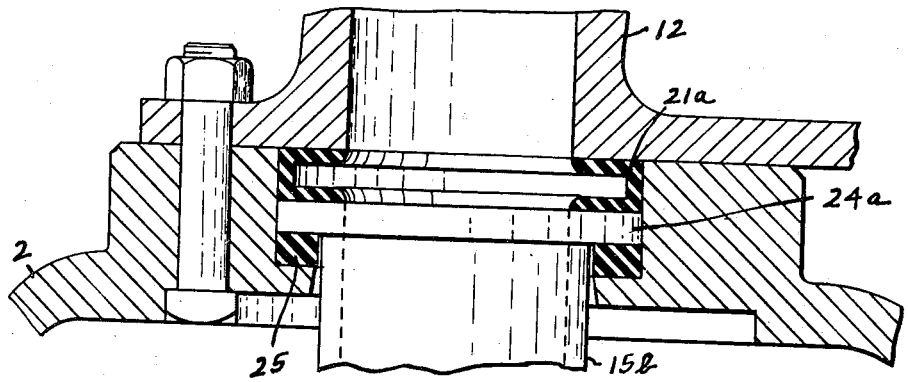
Figure 5 is a vertical, fragmentary, sectional view of another form of the assembly.

As illustrated in Figure 5 the top of the body cover 2 is somewhat thicker than as shown in Figures 3 and 4 and is countersunk to receive the packing about the upper end of the wash pipe 15b. In this embodiment of the invention the upper end of said wash pipe is provided with an external annular flange 24a which is supported on the ring 25. Mounted in said counter bore and above said flange there is a packing ring 21a having upper and lower lips which are turned inwardly, said packing ring 21a being confined between the flange 24a and the base portion of the gooseneck 12.

Excepting as pointed out above the embodiment of the invention illustrated in Figure 5 is substantially the same as that shown in Figure 4.

Figure 6:
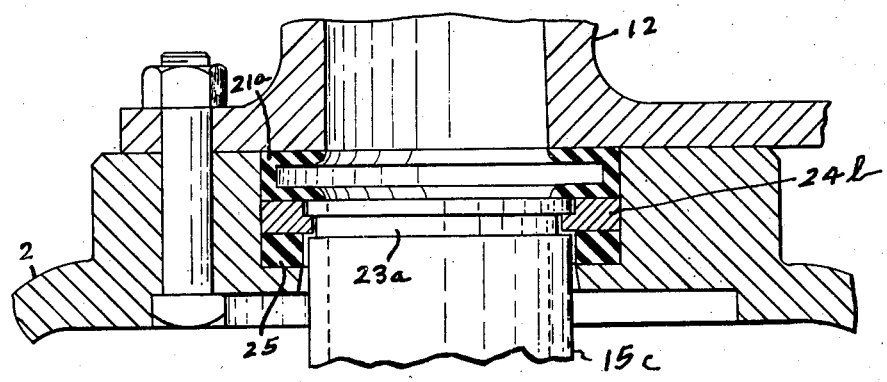
Figure 6 is a fragmentary, vertical, sectional view illustrating a modification of the wash pipe supporting and packing assembly, as shown in Figures 3 and 4.

In Figure 6 the construction of the gooseneck and the body cover 2, as well as the packing 25 and 21a, is identical with the corresponding construction shown in Figure 5, but in this embodiment the sectional retaining ring 24b is somewhat thicker than the retaining ring 24 previously described and it is provided with the inside counter bore forming a flange which projects into the external groove 23a, provided in the upper end of the wash pipe 15c.

Figure 7:
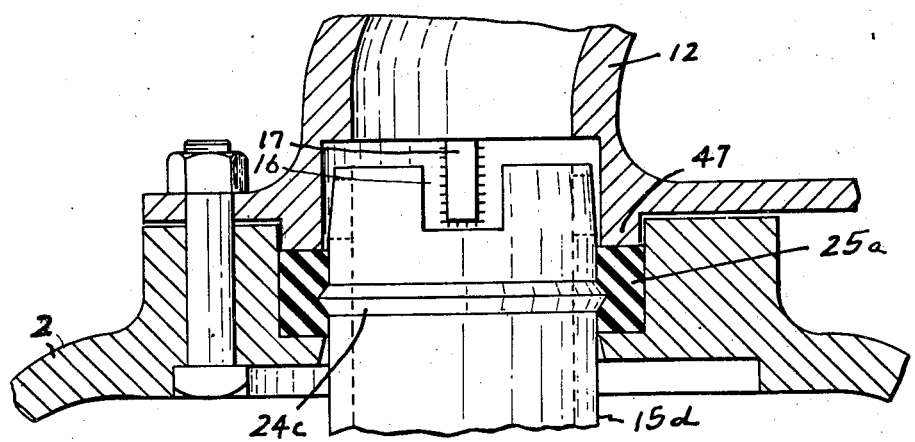
Figure 7 is a fragmentary, vertical, sectional view of another embodiment.

Referring to the embodiment illustrated in Figure 7 the gooseneck 12 is mounted on the body cover 2 and the top of the body cover 2 is thickened and counter bored, as illustrated in Figures 5 and 6, but in this embodiment a relatively thick packing ring 25a is mounted in the counter bore of the cover plate and the base of the gooseneck has a depending, surrounding flange 47 which clamps said packing ring in place. In this embodiment the upper end of the wash pipe 15d has a V-shaped rib 24c therearound which embeds itself into the packing ring 24a to form a fluid tight joint; also the gooseneck is provided with the lug 17 which projects loosely into the upper end notch 16 of said wash pipe to hold the wash pipe against rotation.

Figure 8:
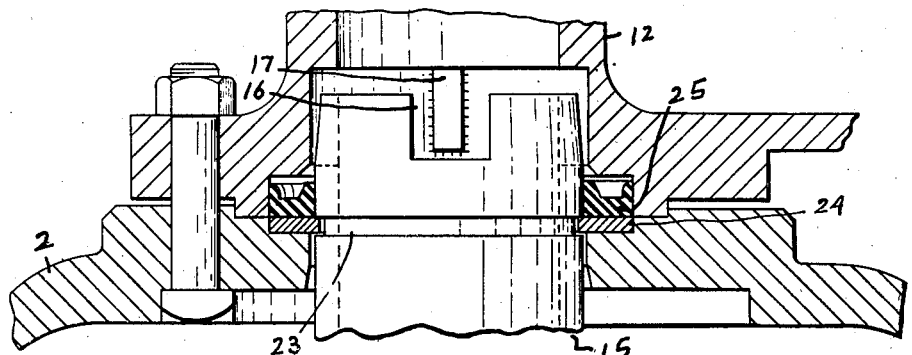
Figure 8 is a fragmentary, vertical, sectional view of the embodiment illustrated in Figures 2 and 4 with the resilient wash pipe supporting ring, or mount, eliminated.

Referring now to Figure 8, the gooseneck 12 and the body cover 2, in this embodiment, are of substantially the same construction, and are secured together in the same manner, as is shown in Figure 4; however in the embodiment shown in Figure 8 the top of the body cover 2 is not counterbored as deeply as in Figure 4, but only deep enough to retain the retaining ring 24 therein, and the packing ring 25 beneath said retaining ring is dispensed with.

In this embodiment of the invention the wash pipe 15 will not reciprocate longitudinally in response to the pump pulsations.

In other respects than those above pointed out the embodiment illustrated in Figure 8 is substantially the same as the construction illustrated in Figure 4.

Figure 9:
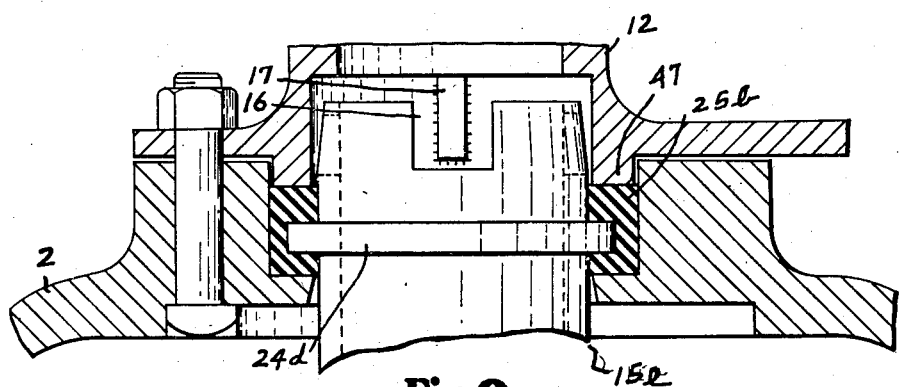
Figure 9 is a fragmentary, vertical, sectional view illustrating the wash pipe with an external supporting rib enclosed by the packing ring.

The embodiment illustrated in Figure 9 is substantially the same as that shown in Figure 7, with the exception that the annular rib 24d on the wash pipe 15e is of rectangular cross section and fits into a correspondingly shaped inside annular groove in the packing 25b.

Figure 10:
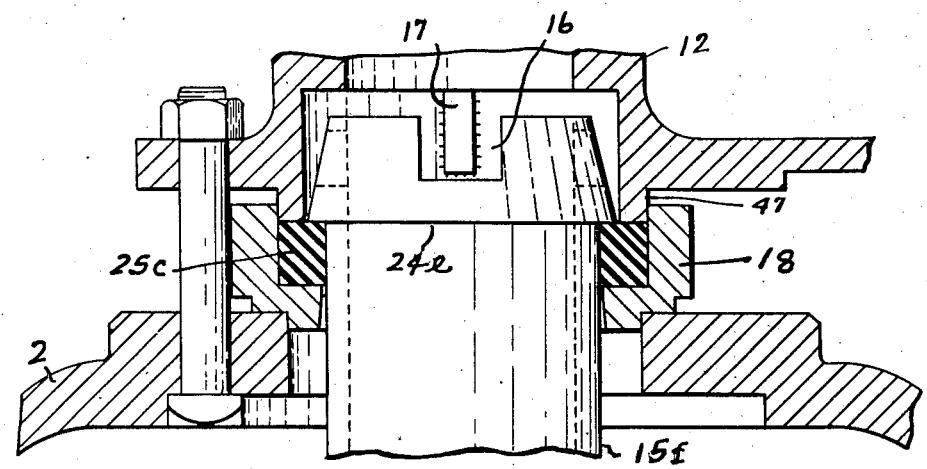
Figure 10 is a fragmentary, vertical, sectional view showing the wash pipe with an external head supported on the packing ring.

Referring to Figure 10 the body cover and gooseneck assembly, including the adapter 18, is substantially the same as that shown in Figure 3; however in this embodiment there is a solid annular packing ring 25c mounted in the counterbore of the adapter 18 and the gooseneck has the depending annular flange 47 which clamps said packing ring in place; also in the embodiment illustrated in Figure 10 the upper end of the wash pipe is provided with an external, annular, downwardly facing shoulder 24e, which rests on said packing ring 25c. In this embodiment the wash pipe is held against turning by the lug 17 carried by the gooseneck, which projects loosely into the notch 16 of said wash pipe.

In each of the embodiments illustrated there is sufficient clearance between the upper end of the wash pipe and the adjacent parts of the gooseneck and body cover to allow the wash pipe to swing or gyrate so as to allow the wash pipe to automatically center itself with respect to the packing and to thereby eliminate any undue wear on the packing and the wash pipe; also in each of the embodiments of the invention, excepting that shown in Figure 8, the wash pipe is resiliently mounted so as to allow it to reciprocate axially with the pump pulsations, thus distributing the wear over a greater portion of the wash pipe and forcing a better distribution of the lubricant.

The drawings and description are illustrative merely while the broad principle of the invention will be defined by the appended claims.

What we claim is:

1. In a swivel having stationary parts provided with a tubular inflow connection and having a rotatable stem mounted on one of said stationary parts, a tubular wash pipe arranged to conduct fluid from said connection to the stem, one end of said wash pipe being reduced in outside diameter and having notches therein, means on said connection loosely extending into said notches, said wash pipe having an external annular groove and at least one of said stationary parts having a counterbore, a resilient sealing ring in said counterbore around the wash pipe occupying less volume than the counterbore and a retaining ring engaging with said sealing ring and removably extending into said groove to form a support for said pipe whereby the latter is free to reciprocate axially and gyrate relative to the stationary parts.

2. In a swivel having a stationary parts provided with a tubular inflow connection and having a rotatable stem mounted on one of said stationary parts, a tubular wash pipe arranged to conduct fluid from said connection to the stem, the upper end of said wash pipe being tapered and having notches in said tapered end, lugs on the lower end of said connection loosely extending into said notches, said wash pipe having an external annular groove and at least one of said stationary parts having a counterbore, a resilient sealing ring in said counterbore around the wash pipe occupying less volume than the counterbore, and a retaining ring engaging with said sealing ring and removably extending into said groove to form a support for said pipe whereby the latter is free to reciprocate axially and gyrate relative to the stationary parts.

3. In a swivel having stationary parts provided with a tubular inflow connection and having a rotatable stem mounted on one of said stationary parts, a tubular wash pipe arranged to conduct fluid from said connection to the stem, one end of said wash pipe being loosely connected with said connection to prevent rotation of said wash pipe, said wash pipe having an external annular groove and at least one of said stationary parts having a counterbore, a resilient sealing ring in said counterbore around the wash pipe, and a retaining ring supporting said sealing ring and removably and freely extending into said groove to form a support for said pipe, and a resilient supporting ring in said counterbore around the wash pipe engaging with said retaining ring to form a support for said pipe, said rings occupying less volume than said counterbore, said resilient supporting ring being arranged in the counterbore so that it can flow laterally, and one of said stationary parts being spaced from said wash pipe below said supporting ring whereby the wash pipe is free to reciprocate axially and gyrate relative to the stationary parts.

RICHARD R. BLOSS.
ARCHIE R. McLERRAN.

REFERENCES CITED

The following references are of record in the file of this patent:

UNITED STATES PATENTS

| Number | Name | Date |
| --- | --- | --- |
| 343,138 | McHugh | June 1, 1886 |
| 1,830,440 | Morgan | Nov. 3, 1931 |
| 2,029,631 | Morgan, Jr., et al. | Feb. 4, 1936 |
| 2,031,337 | Spalding | Feb. 18, 1936 |
| 2,237,715 | Shaw et al. | Apr. 8, 1941 |